(12) United States Patent
Jacobs et al.

(10) Patent No.: US 7,522,257 B2
(45) Date of Patent: Apr. 21, 2009

(54) SYSTEM AND METHOD FOR A 3-D PHENOMENOSCOPE

(76) Inventors: Kenneth Jacobs, 94 Chambers St., New York, NY (US) 10007; Ronald Steven Karpf, 11425 Brandy Hall La., Gaithersburg, MD (US) 20878

( * ) Notice: Subject to any disclaimer, the term of this patent is extended or adjusted under 35 U.S.C. 154(b) by 446 days.

(21) Appl. No.: 11/372,723

(22) Filed: Mar. 10, 2006

(65) Prior Publication Data

US 2006/0268105 A1    Nov. 30, 2006

Related U.S. Application Data

(63) Continuation-in-part of application No. 10/054,607, filed on Jan. 22, 2002, now Pat. No. 7,030,902.

(60) Provisional application No. 60/664,369, filed on Mar. 23, 2005, provisional application No. 60/263,498, filed on Jan. 23, 2001.

(51) Int. Cl.
*G03B 21/14* (2006.01)
*G03B 21/32* (2006.01)

(52) U.S. Cl. .............. 352/62; 353/7; 359/465

(58) Field of Classification Search .......... 353/7, 353/8, 10; 352/63, 57–65; 359/15, 464, 359/465, 466, 469; 348/53, 56, 57
See application file for complete search history.

(56) References Cited

U.S. PATENT DOCUMENTS

| | | |
|---|---|---|
| 4,049,339 A | 9/1977 | Ledan |
| 4,429,951 A | 2/1984 | Hirano |
| 4,597,634 A | 7/1986 | Steenblik |
| 4,705,371 A | 11/1987 | Beard |
| 4,717,239 A | 1/1988 | Steenblik |
| 4,805,988 A | 2/1989 | Dones |
| 4,893,898 A * | 1/1990 | Beard ......................... 359/464 |
| 5,002,364 A | 3/1991 | Steenblik |
| 5,144,344 A * | 9/1992 | Takahashi et al. ............. 351/44 |
| 5,717,415 A | 2/1998 | Iue et al. |

(Continued)

OTHER PUBLICATIONS

Lit et al., Simple reaction time as a function of luminance for various wavelengths, Perception & Psychophysics, vol. 10(6), pp. 1-7, 1971.

(Continued)

*Primary Examiner*—William C Dowling
(74) *Attorney, Agent, or Firm*—Lucas & Mercanti, LLP

(57) ABSTRACT

A system for a 3-D Phenomenoscope to view 3-dimensional special effects in motion pictures, and a method by which ordinary 2-dimensional motion pictures can be viewed as a 3-dimensionsal experience are disclosed. It provides (a) a 3-D Phenomenoscope with right and left lenses, where the degree of darkness of the right and left lenses can be individually controlled; (b) a digital photo sensors that can capture the viewed motion picture as successive images and convert the captured frames to digital images for processing; (c) a computer processor and a computer program to process the successive images and identify lateral motion synchronization events, and (d) a control unit to provide individual control for the light-reduction or darkening of the right or left lens based on the identified synchronization events. These system and method allow any motion picture to be viewed with the visual effect of 3-dimensions.

24 Claims, 6 Drawing Sheets

U.S. PATENT DOCUMENTS

| | | | |
|---|---|---|---|
| 5,721,692 | A | 2/1998 | Nagaya |
| 5,821,989 | A * | 10/1998 | Lazzaro et al. ............... 348/56 |
| 6,115,177 | A * | 9/2000 | Vossler ...................... 359/465 |
| 6,385,245 | B1 | 5/2002 | De Haan et al. |
| 6,598,968 | B1 | 7/2003 | Davino |
| 6,676,259 | B1 * | 1/2004 | Trifilo ......................... 353/20 |
| 7,030,902 | B2 * | 4/2006 | Jacobs ......................... 348/42 |
| 7,218,339 | B2 * | 5/2007 | Jacobs ......................... 348/42 |
| 7,405,801 | B2 * | 7/2008 | Jacobs ......................... 352/85 |
| 2002/0039230 | A1* | 4/2002 | Lin ............................ 359/465 |
| 2003/0030904 | A1* | 2/2003 | Huang ........................ 359/466 |
| 2007/0206155 | A1* | 9/2007 | Lipton ........................... 353/7 |
| 2008/0043203 | A1* | 2/2008 | Jacobs et al. ................. 352/63 |

OTHER PUBLICATIONS

Lit A., The magnitude of the pulfrich stereo-phenomenon as function of target velocity, Journal of Experimental Psychology, vol.59(3), pp. 165-175, 1960.

Dipery, B., Video improvements obviate big bit streams, EDN: Information, News & Business Strategy for Electronics Design Engineers, pp.83-102, Mar. 15, 2001.

Dipert, B., Video quality: a hands-on view, EDN: Information, News & Business Strategy for Electronics Design Engineers, pp. 83-96, Jun. 7, 2001.

Philips semiconductors Melzonic chip-Technology backgrounder, Press Release by NXP, Mar. 3, 1997.

* cited by examiner

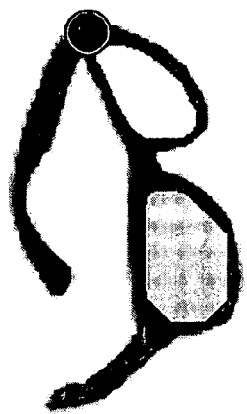
Figure 3b
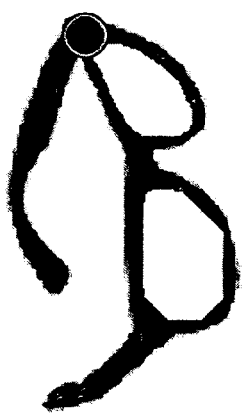
Figure 3a
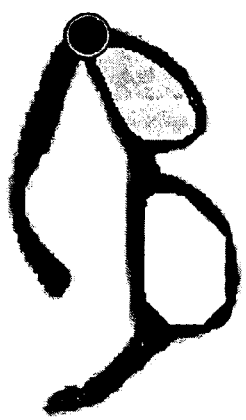
Figure 3c
Figure 3

700

If synchronization event NOT found then
 Set lens state to clear-clear
Else if synchronization event is found then
 If synchronization event is for left-to-right movement then
  Set lens state to clear-tint
 else if synchronization event is for right-to-left movement then
  Set lens state to tint-clear

Figure 6

SYSTEM AND METHOD FOR A 3-D PHENOMENOSCOPE

RELATED APPLICATION DATA

This application claims priority of U.S. Provisional Application No. 60/664,369 filed on Mar. 23, 2005, and is a continuation-in-part of application Ser. No. 10/054,607 filed on Jan. 22, 2002, now U.S. Pat. No. 7,030,902, that also claims priority of U.S. Provisional Application No. 60/263,498 filed on Jan. 23, 2001 with the entire contents of each application being herein incorporated by reference.

TECHNICAL FIELD

This invention relates to the field of motion pictures, and more specifically to a system that will allow almost any motion picture to be viewed effortlessly by the viewer with the visual effect of 3-dimensions.

PRIOR ART REFERENCES

A number of products and methods have been developed for producing 3-D images from two-dimensional images. Steenblik in U.S. Pat. Nos. 4,597,634, 4,717,239, and 5,002,364 teaches the use of diffractive optical elements with double prisms, one prism being made of a low-dispersion prism and the second prism being made of a high-dispersion prism. Takahaski, et al in U.S. Pat. No. 5,144,344 teaches the use of spectacles based on the Pulfrich effect with light filtering lens of different optical densities. Beard in U.S. Pat. No. 4,705,371 teaches the use of gradients of optical densities in going from the center to the periphery of a lens. Hirano in U.S. Pat. No. 4,429,951 teaches the use of spectacles with lenses that can rotate about a vertical axis to create stereoscopic effects. Laden in U.S. Pat. No. 4,049,339 teaches the use of spectacles with opaque temples and an opaque rectangular frame, except for triangular shaped lenses positioned in the frame adjacent to a nosepiece.

Davino, U.S. Pat. No. 6,598,968, '3-Dimensional Movie and Television Viewer', teaches an opaque frame that can be placed in front of a user's eyes like a pair of glasses for 3-D viewing to take advantage of the Pulfrich effect. The frame has two rectangular apertures. These apertures are spaced to be in directly in front of the user's eyes. One aperture is empty; the other opening has plural vertical strips, preferably two, made of polyester film. Between the outer edge of the aperture and the outermost vertical strip is diffractive optical material. The surface of the strips facing away from the person's face might be painted black. Images from a television set or a movie screen appear three dimensional when viewed through the frame with both eyes open.

Synchronization and Control

The 3-D Phenomenoscope invention makes use of signals to synchronize the lens filters to the lateral motion in the motion picture, and thus control the 3-dimensional visual effect for the viewer. The signals are developed in real-time by the 3-D Phenomenoscope, and does not require any alteration to the motion picture, or that any control information is placed in the motion picture. The information that is calculated is used to determine synchronization events that are used to control individually, the state of darkening of the lenses of the 3-D Phenomenoscope.

Motion pictures have benefited from other types of synchronization and control information that is placed within the frames of motion pictures. However, these are characteristically different than the synchronization and control used in this invention.

In many motion pictures, to alert the movie theater projectionist that it is time to change reels, movie producers would place visible control information, in the form of a white circle appearing in the upper right upper hand corner of successive frames of the movie. When the projectionist sees this information, they know that it is time to start a second projector that has the next reel of the movie, and thus maintain an uninterrupted motion picture presentation.

Another means of communicating control information in motion picture frames is with the clapper slate board that indicates the start of a new scene when filming a motion picture. When filming motion picture or other type of video production, video and audio have been recorded separately. The two separate recordings must be precisely synchronized to insure that the audio recording matches the video image. Synchronization of the video and audio recordings has been accomplished using a clapper slate board. The audible clap created when a technician snaps the slate board in front of the camera is used during editing to manually synchronize the audio recording with the video recording. The editor simply views the video image of the snapping clapper slate, and then manually adjusts the timing of the audio recording such that the image of the clapper snapping shut and the sound of the clapper snapping shut are synchronized. Such synchronization can now be accomplished using electronic clapper slates. Electronic clapper slates display a Society of Motion Picture and Television Engineers (SMPTE) code, usually in large red light emitting diode numerals. The SMPTE code displayed is then used to electronically synchronize the video recording with a separate audio recording.

These types of synchronization and control information solve problems related to the synchronization of sound with filmed action during the production and editing of motion pictures, and related to changing reels of film during the presentation of motion pictures.

The preferred embodiment of the 3D Phenomenoscope uses a computer algorithm running on a computer processor contained within the 3-D Phenomenoscope to calculate in real-time, and from a multiplicity of media frames, the synchronization and control events. The preferred embodiment has no moving parts and no wire connections, and uses material that partially occludes or entirely clears in response to the received electronic signals. The 3D Phenomenoscope has a means to receive, and process the video of the motion picture, and control the left and right lenses. In this way, the 3-D Phenomenoscope allows any motion picture with a degree of sustained lateral motion (for instance, every 'chase' sequence) to be viewed with the visual effect of 3-dimensions.

The 3-dimensional visual effect is produced by the 3-D Phenomenoscope regardless of whether the motion picture was shot on regular or digital film; regardless of whether the presentation media is film, digital film, VCR tape, or DVD, and; regardless of whether the motion picture is viewed in the movie theater, home TV, Cable TV, or on a PC monitor.

BACKGROUND OF THE INVENTION

Visual effects have the potential to expand the viewing enjoyment of moviegoers. For example the movement effect 'Bullet Time' utilized in the movie 'The Matrix' was critical to the appeal of the movie.

Visual effects for 3-dimensional motion pictures have been used commercially since the early 1920s, and include such motion pictures as 'Charge at Feather River', starring Guy Madison. The 'Vincent Price movie 'House of Wax' was originally released as a 3-D thriller. The 3-D movie fad of the early to mid-1950s however soon faded due to complexity of the technologies and potential for improper synchronization, and alignment of left and right eye images as delivered to the viewer.

TV 3-D motion pictures have been attempted from time-to-time. Theatric Support produced the first TV Pulfrich event in 1989 for Fox Television—The Rose Parade in 3D "Live." In order to sustain the illusion of realistic depth these 3-D Pulfrich effect TV shows require all foreground screen action to move in one consistent direction, matched to the fixed light-diminishing lens of special spectacles provided to viewers for each broadcast. This enormous constraint (for all screen action to proceed in one direction) placed on the producers of the motion picture is due to the realistic expectation that viewers were not going to invert their spectacles so as to switch the light-diminishing filter from one eye to another for each change in screen-action direction. For the great majority of viewers the limitation of spectacles with a fixed filter, either left or right, meant the 3D effect would be available only with movies produced specifically for that viewing spectacles design.

With the exception of Sony I-max 3-D presentations, which require special theater/screening facilities unique to the requirements of I-Max technology, 3-dimensional motion pictures remain a novelty. Despite the wide appeal to viewers, the difficulties and burden on motion picture producers, distributors, motion picture theaters, and on the viewers has been a barrier to their wide scale acceptance.

Vision

The Human Eye and Depth Perception

The human eye can sense and interpret electromagnetic radiation in the wavelengths of about 400 to 700 nanometers—visual light to the human eye. Many electronic instruments, such as camcorders, cell phone cameras, etc., are also able to sense and record electromagnetic radiation in the band of wavelengths 400-700 nanometer.

To facilitate vision, the human eye does considerable 'image processing' before the brain gets the image. As examples:
1. When light ceases to stimulate the eyes photoreceptors, the photoreceptors continue to send signals, or 'fire' for a fraction of a second afterwards. This is called 'persistence of vision', and is key to the invention of motion pictures that allows humans to perceive rapidly changing and flickering individual images as a continuous moving image.
2. The photoreceptors of the human eye do not 'fire' instantaneously. Low light conditions can take a few thousands of a second longer to transmit signals than under higher light conditions. Causing less light to be received in one eye than another eye, thus causing the photoreceptors of the right and left eyes to transmit their 'pictures' at slightly different times, explains in part the Pulfrich 3-D illusion, which is utilized in the invention of a 3-D Phenomenoscope. This is also cause of what is commonly referred to as 'night vision'.

Once signals are sent to the eye, the brain process the dual stereo images together (images received from the left and right eye) presenting the world to the human eye in 3-dimensions or with 'Depth Perception'. This is accomplished by several means that have been long understood.

Stereopsis is the primary means of depth perception and requires sight from both eyes. The brain processes the dual images, and triangulates the two images received from the left and right eye, sensing how far inward the eyes are pointing to focus the object.

Perspective uses information that if two objects are the same size, but one object is closer to the viewer than the other object, then the closer object will appear larger. The brain processes this information to provide clues that are interpreted as perceived depth.

Motion parallax is the effect that the further objects are away from us, the slower they move across our field of vision. The brain processes motion parallax information to provide clues that are interpreted as perceived depth.

Shadows provide another clue to the human brain, which can be perceived as depth. Shading objects, to create the illusions of shadows and thus depth, is widely used as in the shading of text to produce a 3-dimensional impression without actually penetrating (perceptually) the 2-D screen surface.

3-D Motion Pictures

Methods of Producing 3-D Illusion in Moving Pictures

Motion pictures are images in 2-dimensions. However, several methods have been developed for providing the illusion of depth in motion pictures. These include the Pulfrich, and Analglyph 3-dimensional illusions.

Analglyph 3-Dimensional Illusion

"Analglyph" refers to the red/blue or red/green glasses that are used in comic books and in cereal packets etc. The glasses consist of nothing more than one piece of transparent blue plastic and one piece of transparent red plastic. These glasses are easy to manufacture and have been around since the 1950s.

An analglyph stereo picture starts as a normal stereo pair of images, two images of the same scene, shot from slightly different positions. One image is then made all green/blue and the other is made all red, the two are then added to each other.

When the image is viewed through the glasses the red parts are seen by one eye and the other sees the green/blue parts. This effect is fairly simple to do with photography, and extremely easy to do on a PC, and it can even be hand-drawn. The main limitation of this technique is that because the color is used in this way, the true color content of the image is usually lost and the resulting images are in black and white. As the colors compete for dominance they may appear unstable and monochromatic. A few images can retain their original color content, but the photographer has to be very selective with color and picture content.

Pulfrich 3-Dimensional Illusion

Pulfrich was a physicist that recognized that images that travel through a dark lens take longer to register with the brain than it does for an image that passes through a clear lens. The delay is not great—just milliseconds—just enough for a frame of video to arrive one frame later on the eye that is covered by a darker lens than a clear lens. Pulfrich spectacles then have one clear lens (or is absent a lens) that does not cause a delay, and one darkened lens that slightly delays the image that arrives to the eye. In a motion picture viewed through Pulfrich lenses, for an object moving laterally across the screen, one eye sees the current frame and the other eye a previous frame.

The disparity between the two images is perceived as depth information. The brain assumes both frames belong to the same object and the viewer's eyes focus on the object as if it were closer than it is. The faster the object moves, the more separation there is between the time-delayed images, and the closer the object appears. The fact that faster objects appear closer than slower objects also coincides with the principles of motion parallax. Generally, however, the greater displacements frame to frame (and now eye to eye) result from degrees of closeness to the recording camera (proximity magnifies), so that Pulfrich viewing can deliver an approximately correct and familiar depth likeness. While the depth likeness is unquestionably 3-D, it may differ from the fixed constant of an individual's inter-ocular distance when observing the world directly. Few observers will notice this anymore than they are bothered by the spatial changes resulting from use of telephoto or wide-angle lens in filming scenes.

Motion pictures made for the Pulfrich method can be viewed without any special glasses—appearing as regular motion pictures minus the 3-D effect. Also, motion pictures made without regard for the Pulfrich effect, will still show the 3-D visual effect if lenses are worn and appropriately configured.

The limitation of the Pulfrich technique is that the 3-dimensional illusion only works for objects moving laterally or horizontally across the screen. Motion pictures made to take advantage of these glasses contain lots of horizontal tracking shots or rotational panning shots to create the effect. The illusion does not work if the camera doesn't shift location (of subject matter remaining static), but vertical camera movement will create horizontal movement as field of view expands or contracts. Pulfrich, who first described this illusion, was blind in one eye, and was never able to view the illusion, though he completely predicted and described it.

A basic example of the Pulfich illusion can be seen by viewing either of two TV stations. The news headlines on the CNN Television network or the stock market quotations on CNBC scroll in from the right of the TV screen and across and off the screen to the left. The news or quotations appear in a small band across the bottom of the screen while the network show appears above the scrolling information. When either of these network stations is viewed through Pulfrich glasses, with the darkened lens covering the left eye and the clear lens covering the right eye, the scrolling information appears in vivid 3-dimensions appearing to be in front of the TV screen. If the lenses are reversed with the clear lens covering the left eye and the darkened lens covering the right eye, the scrolling information appears to the viewer as receded, and behind the TV screen.

Another example of the Pulfrich illusion can be seen in the movie 'The Terminator', starring Arnold Schwarzenegger. Any off-the-shelf copy of the movie—VCR tape, or DVD, can be viewed on a TV or PC playback display monitor as originally intended by the filmmaker. But, viewing scenes that include lateral motion from 'The Terminator', such as the scene when Sarah Connors enters a bar to call police (about 29 minutes into the movie) when viewed through Pulfrich glasses (left eye clear lens and right eye dark lens) shows the scene vividly in 3-dimensions, even though this visual effect was totally unintended by the director and cinematographer.

Another stunning example is the famous railroad yard scene from "Gone with the Wind", in which Scarlett O'Hara played by Vivien Leigh walks across the screen from the right as the camera slowly pulls back to show the uncountable wounded and dying confederate soldiers. When viewed through Pulfrich glasses with (left eye clear lens and right eye dark lens), the scene appears to the user in 3-dimensions, even thought it was totally unintended by the director and cinematographer. Interesting here is that the main movement of this scene was created by the camera lifting and receding and so expanding the view. Effective lateral motion resulting from such camera movement would in fact be to only one side of the screen, which the viewers will utilize to interpret the entire scene as in depth.

The 3-D Phenomenoscope will allow any movie, such as "Gone with the Wind" which was shot in 1939, to be viewed in part in 3-dimensions. And with the 3-D Phenomenoscope this new viewing experience does not require any additional effort on the part of the owners, producers, distributors, or projectionists of the motion picture—just that the viewer don the 3-D Phenomenoscope viewing glasses.

Note that the Pulfrich 3-D effect will operate when the left or right filtering does not correspond with the direction of an image's movement on the screen. The depth-impression created is unnatural, a confusion of solid and open space, of forward and rear elements. When confronted by such anomalous depth scenes, most minds will 'turn off', and not acknowledge the confusion. For normal appearing 3-D, mismatched image darkening as related to the direction of the image's movement on the screen must be avoided.

We have described the need to match horizontal direction of foreground screen-movement to Left or Right light-absorbing lens. This, however, is a rule that often has to be judiciously extended and even bent, because all screen-action appropriate to Pulfrich 3-D is not strictly horizontal; horizontal movements that angle up or down, that have a large or even dominant element of the vertical, may still be seen in depth. Even a single moving element in an otherwise static scene can be lifted into relief by way of an adroit application of a corresponding Pulfrich filter. There would even be times when a practiced operator would choose to schedule instances of lens-darkening contrary to the matching-with-foreground-direction rule; the explanation for this lies in the fact that the choice of left or right filter-darkening will pull forward any object or plane of action moving in a matching direction, and there are times when the most interesting action in a picture for seeing in 3D could be at some distance from the foreground, even requiring a Left/Right filter-match at odds with the filter-side that foreground-movement calls for. For instance, if one wished to see marchers in a parade marching Left, to lift them forward of their background would require darkening of the Left lens, but foreground movement could be calling for a Right lens darkening; this would be a situation when a choice might be made to over-ride the foreground-matching rule. In most instances the rule is to be followed, but not mechanically; screen movement is often compound and complex, and an observant individual could arrange a Pulfrich timing for a movie with an alertness to such subtleties that did not limit decisions to recognition of foreground direction alone. As mentioned earlier, there would even be times, when the recording camera had moved either forward or backwards through space, when both Left and Right lenses would half-darken to either side of their centers, outer halves darkening moving forward (with picture elements moving out to both sides from picture-center) or both inner halves darkening when retreating backwards (with picture elements moving in towards center from each side).

One might think that alternating between the screen-flatness of a dialogue scene and the deep space of an action scene would disrupt the following of a story. In fact, just as accompanying movie-music can be intermittent while entirely supporting a story development, dialogue is best attended to with the screen flat and action-spectacle is most effective given the dimension and enhanced clarity of depth. Usually a function of lighting specialists, it is always necessary to make objects and spaces on a flat screen appear distinct from each other; besides making a scene move convincing, 3-D separation of forms and of spatial volumes one from the other speeds up the "reading" of what are essentially spatial events. This is to say: flat can best enable concentration on dialogue; depth-dimension can most effectively deliver action scenes. Alternating between 2-D and 3-D awareness is something we even do, to a degree, in our experience of actuality, as a function of our changing concentration of attention; just as we hear things differently when we concentrate on listening. Then, too, making sense of movies is a thing we learn to do, as different from life-experience as a movie is with its sudden close-ups and change of angle and of scene, its flashbacks, et cetera. Movie viewing is a learned language, a form of thinking; the alternating of flat-screen information with depth-information will be as readily adapted to as any other real-world-impossibility accepted without question as natural to the screen.

In the preferred embodiment of the 3-D Phenomenoscope invention—we focus on a better means to present the Pulfrich 3-D illusion in motion pictures. In other embodiments of the invention, similar principles can be utilized to present other illusions or special effects in motion pictures. While the preferred embodiment uses a simple algorithm to identify passages of lateral movement in the motion picture that will display as a 3-dimensional effect when viewed using the 3-D Phenomenoscope, other embodiments may use more complex algorithms capable of identifying some or all of the screen action that may benefit from a Pulfrich effect.

Problems with 3-D Motion Pictures

With the exception of Sony I-Max 3-d, a special cine-technology requiring theaters designed for its screening requirements, 3-dimensional motion pictures have never caught on, except as a short-term fad, because a myriad of problems continue to make 3-dimensional motion pictures unacceptable to producers and viewers of motion pictures. Despite concerted efforts, 3-dimensional motion pictures continue to be nothing more than a novelty. There are many problems and constraints involving the production, projection, and viewing of 3-dimensional motion pictures.

Production: The commonly used analglyph 3-dimensional movie systems require special cameras that have dual lenses, and capture 2-images on each frame. To have a version of the motion picture that can be viewed without special glasses requires that a separate version of the motion picture be shot with a regular camera so there is only one image per video frame and not simply the selection of one or the other perspective.

Projection: Some 3-dimensional systems require the synchronization and projection by more than 2 cameras in order to achieve the effect. "Hitachi, Ltd has developed a 3D display called Transpost 3D which can be viewed from any direction without wearing special glasses, and utilize twelve cameras and rotating display that allow Transpost 3D motion pictures that can be seen to appear as floating in the display. The principle of the device is that 2D images of an object taken from 24 different directions are projected to a special rotating screen. On a large scale this is commercially unfeasible, as special effects in a motion picture must be able to be projected with standard projection equipment in a movie theater, TV or other broadcast equipment.

Viewing: As a commercial requirement, any special effect in a motion picture must allow viewing on a movie screen, and other viewing venues such as TV, DVD, VCR, PC computer screen, plasma and LCD displays. From the viewer's vantage, 3-dimensional glasses, whether analglyph glasses or Pulfrich glasses, which are used in the majority of 3-dimensional efforts, if poorly made or worn incorrectly are uncomfortable and may cause undue eyestrain or headaches. Experiencing such headache motivates people to shy away from 3-D motion pictures.

Because of these and other problems, 3-dimensional motion pictures have never been more than a novelty. The inconvenience and cost factors for producers, special equipment projection requirements, and viewer discomfort raise a sufficiently high barrier to 3-dimensional motion pictures that they are rarely produced. A main object of this invention is to overcome these problems and constraints.

Attempts to Overcome the Problems of 3-D Motion Pictures

Different formulations of shutter glasses have been implemented over the last few decades, but without much large-scale commercial success. A shutter glasses solution generally require two images for each image of video, with shutter covering or uncovering each eye of the viewer. This allows one eye to see, than the other, with the shutters timed and synchronized with the video so that each eye only sees the image intended for it. Recent advances have eliminated mechanical shutter, and now use lens that turn opaque when an electric current is passed through it.

Some shutter glass systems are wired to a control device while some shutter glass systems use wireless infrared signaling to control the state of the lenses.

CrystalEyes is the name of a stereoscopic viewing product produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. CrystalEyes shutter glasses, weight only 3.3 ounces, use two 3V lithium/manganese dioxide batteries, and have a battery life of 250 hours. This demonstrates the robustness and potential of a viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

However, shutter systems have not been overwhelmingly commercially successful. Motion pictures that use such stereo shutter systems require two frames for each frame of regular film. Motion pictures would then have to be produced in at least 2 versions. Also, except on high refresh rate systems, such as expensive PC monitors, the viewer sees too much 'flicker' causing distraction and annoyance. An additional requirement and burden is the wired or wireless signaling to control the state of the lens. LCD screens that are used on laptops generally do not have high enough refresh rates for stereoscopic shutter 3D systems. Shutter systems generally do not work well with LCD or movie projectors.

In the preferred embodiment of this invention, in a manner similar to that used with some versions of shutter glasses, we utilize lens materials that are clear when no current is passed through it, but partially occluded or darkened when a current above a threshold voltage is passed through it.

SUMMARY OF THE INVENTION

Preferred embodiments of the 3-D Phenomenoscope invention solve the foregoing (and other) problems, and present significant advantages and benefits by providing a system to view 3-dimensional and other special effects in motion pictures. It is, therefore, an object of the preferred embodiment of the invention to provide a system by which ordinary 2-dimensional motion pictures can be viewed in part as a 3-dimensional experience.

The 3-D Phenomenoscope achieves this by taking advantage of the well-known Pulfrich effect, through which lateral motion of an ordinary motion picture will appear to the viewer in 3-Dimensions.

Ordinary glasses are configured with;
(a) Right and left lenses for which the darkening of the glasses can be individually controlled
(b) Digital photo sensors (digital camera) that can capture the viewed motion picture as successive images and convert the captured frames to digital images for processing
(c) Computer processor and computer program to process the successive images and identify the synchronization events, and
(d) Means to provide individual control for the darkening of the right and left hand lenses based on the identified synchronization events.

Unlike prior inventions that used shutter glasses, in the preferred embodiment of the invention, the control for the viewing glasses is not a wired, wireless or infrared signal, but information calculated in real-time from successive frames of the motion picture. We add to viewing glasses that have individually controllable lens, a photo sensor to convert the analog video image to a digital format, and a computer processor to process the digital image and calculate from successive file frames the synchronization signals to control the state of the 3-D Phenomenoscope right and left lenses and produce the desired video effect.

In the preferred embodiment, the lenses of the viewing goggles may take 3 different states; (a) clear-clear for the right and left eyes; (b) clear-darkened for the right and left eyes, and; (c) darkened-clear for the right and left eyes. In other embodiments, the lenses may be capable of various other states that correspond to different levels of darkening.

In the preferred embodiment, the viewing glasses look just like ordinary lightweight glasses—2 lenses, earpieces, and a nose rest. The viewing glasses also have an attached digital sensor that 'sees' and quantifies the digital snapshot captured by the digital sensor. For each frame, an algorithm operating on a computer processor that is attached and part of the 3-D Phenomenoscope, is able to process the successive images digital images, identify lateral movement and synchronization events, and cause the lenses of the viewing glasses to assume the appropriate right-left lens states.

In this way the viewing glasses work regardless of the viewing media—TV, film, DVD, computer monitor, liquid crystal display, plasma display, etc.

The preferred embodiment of the 3-D Phenomenoscope invention overcomes problems of providing 3-dimensional illusions in motion pictures and achieves the following major benefits:
1. No special equipment is needed for the filming of the motion picture. Ordinary film or digital technology can be used to shoot the movie. The motion picture can even be the result of animation.
2. Works equally well whether the movie is released in any of the various film or digital formats.
3. Allows older or motion pictures produced before the invention of the 3-D Phenomenoscope to be viewed with a 3-dimensional effect.
4. No special equipment is needed for the projection of the motion picture. The movie can be viewed on a TV, DVD player, PC, or in a movie house.
5. The battery-powered viewer glasses are controlled in real-time by an intelligent processor packaged with the glasses, so 3-dimensional viewing works equally well whether the movie is viewed on a TV, DVD player, PC, or in a movie house.
6. Since darkening of the lenses to obtain the 3-dimensional illusion is only activated when sustained lateral motion is detected, eyestrain and discomfort is greatly reduced.

BRIEF DESCRIPTION OF THE DRAWINGS

Many advantages, features, and applications of the invention will be apparent from the following detailed description of the invention that is provided in connection with the accompanying drawings in which:

FIG. 3 is a block diagram showing the 3 different right and lens configurations and how they are synchronized to the foreground lateral motion of the motion picture.

FIG. 6 is the decision procedure used by the real-time control algorithm to control the state of viewer glasses.

DETAILED DESCRIPTION OF THE PREFERRED EMBODIMENT

Figure 1:
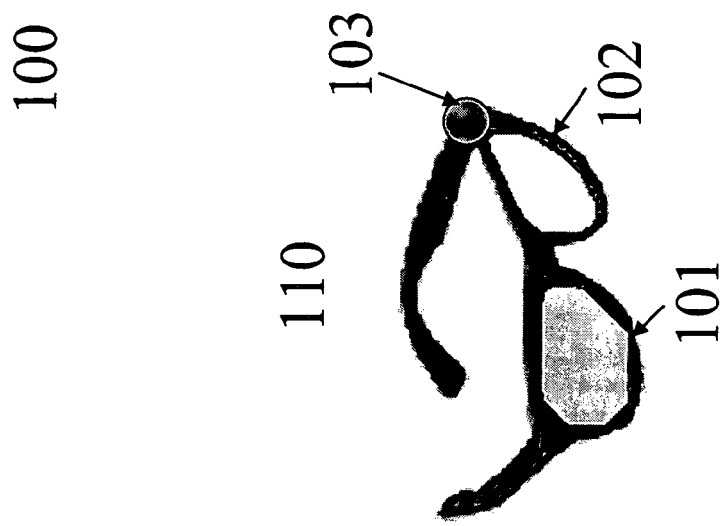
FIG. 1 is a block diagram illustrating a preferred embodiment of the 3-D Phenomenoscope.

Preferred embodiments and applications of the invention will now be described with reference to FIGS. 1-6. Other embodiments may be realized and structural or logical changes may be made to the disclosed embodiments without departing from the spirit or scope of the invention. Although the invention is particularly described as applied to the viewing of motion pictures that include scenes that can benefit from the Pulfrich 3-dimensional illusion, it should be readily apparent that the invention may be embodied to advantage for other visual effects.

In particular, the invention is readily extendable to other embodiments resulting in other motion picture video effects that result from the processing of the motion picture images by a processor on the viewing glasses, and the resulting control of the viewing glasses lenses. It is also readily extendable to other algorithms that can detect passages of screen motion that can benefit from the Pulfrich effect other than the simple lateral movement described in the preferred embodiment.

Technologies Utilized in the Invention

Substances that Change Color and Transparency

Objects that change color have been well known for a long time. Animate creatures such as cephalopods (squid) have long been known for their ability to change color seemingly at will, by expanding or retracting chromatophore cells in their body.

There are many different technologies that are used to cause physical materials to change their color and transparency. These may react to heat, light, ultraviolet light, or electronic means to change their state, which in turn affect how they reflect and refract light, or their properties of transparency, or translucency.

For instance, photochromatic lenses automatically darken in sunlight and lighten when indoors, and have been utilized in sunglasses for many years. Some may darken instantaneously, and others have lenses that take several different shades depending upon the intensity of the light presented.

Thermochromatic materials are heat activated, causing the color to change when the activation temperature is reached, and reverse the color change when the area begins to cool. These are used in such products as inks, and strip thermometers.

LEDs (Light Emitting Diodes) are electronic diodes that allow current to flow in one direction and not the other. LEDs have the unique "side effect" of producing light while electricity is flowing through them. Thus they have two states—when electricity flows through them they are 'on' and emit light, or 'off' when no electricity flows through them and they do not emit light.

Phosphors are emissive materials that are used especially in display technologies and that, when exposed to radiation, emits light. Any fluorescent color is really a phosphor. Fluorescent colors absorb invisible ultraviolet light and emit visible light at a characteristic color. In a CRT, phosphor coats the inside of the screen. When the electron beam strikes the phosphor, it makes the screen glow. In a black-and-white screen, there is one phosphor that glows white when struck. In a color screen, there are three phosphors arranged as dots or stripes that emit red, green and blue light. In color screens, there are also three electron beams to illuminate the three different colors together. There are thousands of different phosphors that have been formulated, and that are characterized by their emission color and the length of time emission lasts after they are excited.

Liquid crystals are composed of molecules that tend to be elongated and shaped like a cigar, although scientists have identified a variety of other, highly exotic shapes as well. Because of their elongated shape, under appropriate conditions the molecules can exhibit orientational order, such that all the axes line up in a particular direction. One feature of liquid crystals is that electric current affects them. A particular sort of nematic liquid crystal, called twisted nematics (TN), is naturally twisted. Applying an electric current to these liquid crystals will untwist them to varying degrees, depending on the current's voltage. These crystals react predictably to electric current in such a way as to control light passage.

Still another way to alter the amount of light that passes through a lens is with Polaroid lenses. Polaroids are materials that preferentially transmit light with polarization along one direction that is called the polarization axis of the polaroid. Passing unpolarized light through a polaroid produces transmitted light that is linearly polarized, and reduces the intensity of the light passing through it by about one-half. This reduction in light from a first polaroid does not depend on the filter orientation. Readily available optically active materials are cellophane, clear plastic tableware, and most dextrose sugars (e.g. Karo syrup). Materials that alter the polarization of light transmitted through them are said to be optically active.

If two polaroids are placed immediately adjacent to each other at right angles (crossed) no light is transmitted through the pair. If two similar polaroids immediately adjacent to each other are in complete alignment, then the second polaroid does not further reduce the intensity of light passing though the first lens. Additional reduction of light intensity passing through the first polaroid lens will occur if the two similar polaroids immediately adjacent to each other are in other then complete or right angle alignment. This can be beneficially used in other embodiments of the invention to more precisely control the intensity of light passing through the 3-D Phenomenoscope lenses.

Polaroids can be actively controlled by electronic currents, and are used in such products as LCD displays. For example digital watches often use LCD display for the display of time. In such products, there is a light source behind two layers of LCD materials. Electronic current is used to control the polarity of specific areas of the two layers. Any area of the screen for which the two polaroid layers are at right angles to each other will not pass any light—other areas will allow light to pass. In this manner, the alphanumeric information of LCD can be electronically controlled and displayed on an LCD display.

Another technology to control the intensity of light passing through the lenses includes directional filters such as the micro-louver.

In the preferred embodiment of this invention, we utilize liquid crystals for the lenses that change transparency when an electronic current is passed through them. In particular, we use a substance that is darkened (allowing some light to pass through) when current is applied across it, but is clear and transparent and allows light to pass unhindered when no current is applied to it. In other embodiments of the invention, other substances and technologies could be used that allow the lenses to change their color, or their properties of transparency or translucency.

Digital Photo Sensors

Small, inexpensive, low power digital photo cameras are becoming ubiquitous. Many cell phones now feature the ability to take a still or video picture using a camera included as part of the phone. The pictures and/or video are processed on the cell phone and can then be sent wirelessly over the cell phone network, or stored in digital format on the phone.

Just as the light sensitive nerves of the eye called photoreceptors (rods and cones) convert light to electrical impulses that are sent to the brain via the optic nerve, digital photographic instrument have materials that act like human photoreceptors, translating visual light into a measurable quantity that represents its color, and sending the encoded color to a processor via electronic circuitry.

Digital sensors consist of an array of "pixels" collecting photons, the minute energy packets of which light consists. The number of photons collected in each pixel is converted into an electrical charge by the light sensitive photodiode. This charge is then converted into a voltage, amplified, and converted to a digital value via the analog to digital converter, so that the camera can process the values into the final digital image.

The 'eye' of such digital photographic instruments senses light and translates it into a number representing a color. For instance the 'eye' of the instrument may be capable of resolving the color to any of a fixed number (16, 64, 64K, etc) of colors, and does it at discrete evenly spaced increments—pixels. For instance, a common field of vision for a digital photographic instrument may be a rectangular area with 640× 480 pixels, and each pixel may be able to accurately sense and record the color to one of 256 different colors. Such photographic qualities are common now in low-end digital cameras and video recorders. Higher end digital cameras may achieve 35 mm quality pictures with resolutions of 3000 pixels per inch, and are able to distinguish 65K different colors (or even higher).

One such camera is the Flycam CF, manufactured by the LifeView Company, located at 46781 Fremont, Blvd., Fremont, Calif. 94538, USA. The Flycam CF can capture video at up to 30 fps, and weights only 20 grams (seven tenths of an ounce).

A common way for such instruments to quantify light is to measure the levels of 'red', 'green' and 'blue' color (575, 535, and 445 nanometer wavelengths respectively). Every color in the visual light spectrum can be represented as a triad of these three colors.

This is similar to how our eyes work. The cone-shaped cells inside our eyes are sensitive to red, green, and blue—the "primary colors". We perceive all other colors as combinations of these primary colors. In conventional photography, the red, green, and blue components of light expose the corresponding chemical layers of color film. The newly developed Foveon sensors are based on the same principle, and have three sensor layers that measure the primary colors. Combining these color layers results in a digital image, basically a mosaic of square tiles or "pixels" of uniform color which are so tiny that it appears uniform and smooth.

Many other inventions utilize the triad of 'red', 'green', and 'blue' to represent pictures. Color film is a layer of three emulsions, each sensitive to a different one of these three colors. Cathode Ray Color Tube (CRT) technology, is a vacuum tube that emits beams of electrons that excite phosphorescent receptors on the screen that radiate light at these three different frequencies.

Different technologies, well known in the art of photography have been developed to sense and measure light at distinct quantities known commonly as pixels, and send the measured quantity to a processor via electronic circuitry. In the preferred embodiment, we use an inexpensive and low-resolution photo lens, consisting of a 640×480 pixels and that can distinguish and record light as one of 256 different colors. In other embodiments, other digital photo lenses may be used, as for example, ones that have higher or lower resolutions.

Miniature Special Purpose Computers

The miniaturization of computers has advanced at a continuing and increasing pace—especially for special purpose computers that serve a dedicated function. As an example, digital hearing aids have been miniaturized to such an extent that they can fit almost undetected in the ear.

Built around special purpose computer, digital hearing aid devices take analog sound presented to the ear, convert the sound to digital format, perform major signal process of the digitized sound, and then enhance the signal which is converted back to an analog signal and played to the user. A typical problem in older men is that they have progressively more hearing loss in higher than lower sound frequencies. Often older women have the reverse problem with progressively more hearing loss in lower rather than higher frequencies. Digital hearing aids can selectively enhance different ranges of frequencies, allowing hearing impaired users to hear normally.

Other digital hearing aids address the 'cocktail party' problem. A person without hearing impairment is able to 'mute' out the surrounding sound at a cocktail party, and just focus on conversation with a person directly in front of them. The hearing impaired progressively loses this ear/mind ability. But the cues and process by which this muting is done is in part understood, and digital hearing aids can digitally replicate this process and process sound to simulate the way a normal person 'mutes' out surrounding sound.

Global Positioning chips provide another example of a special purpose miniaturized, low-power dedicated computer-on-a-chip that performs complex functions. The constellation of Global Positioning Satellites (GPS) that make up the system, broadcast signals that allow GPS receivers to identify their position on the earth surface to within a few meters of accuracy. GPS chips are the real-time processor for terrestrial appliances (such as cell phones) to accurately identify geographic position, and can lock-onto the spread-spectrum signal of multiple satellites, perform analog-to-digital (A/D) conversion of the signals, extract several different formats of signals, and perform complex trigonometric calculations to triangulate and determine the base-stations geographic position on the earth.

Special purpose and dedicated computer miniaturization provides a level of technology in which miniaturized computers weight little, are rugged, powerful, small, perform extremely complicated mathematical and processing functions in real-time, and run on small and light-weight batteries for several weeks at a time. Such a special purpose computer will be utilized in the preferred embodiment of the invention.

Algorithms to Detect Movement in Motion Pictures

Early motion detectors were entirely analog in nature but completely suitable to monitor situations where no motion is to be expected, such as restricted areas in museums, and stores when they are closed for the evening. Recent advances in digital photography and computers have allowed new means to monitor such situations, and incorporate digital video systems that can passively record images at set time intervals (e.g. 15 frames per second), computer processors to process the image and detect motion, and cause appropriate action to be taken if motion is detected.

Many different algorithms have been developed for computer processing of images that can be used to determine the presence of lateral movement in a motion picture, as well as identifying the direction of lateral motion. In the future new algorithms will continue to be developed. Any algorithm that can process sequences of digital images, and detect motion and the direction of motion can be used in the invention.

The selection for the lens control algorithm may depend on the computational power of the attached 3-D Phenomenoscope processor, requiring the selection of algorithm that is appropriate to the level of its computational power.

In the preferred embodiment we will utilize an intensity edge map algorithm. Edge-based algorithms have been used in digital cameras as part of the means to implement functions such as auto-focus. Edge-based algorithms utilize information that can be calculated from the discontinuities between adjoining pixels of the digitized image. For instance, consider a person standing against a light background. The edge pixels of the person can be clearly identified because of the sudden change in pixel value. Edge-based algorithms generally identify such intensity edges in the image, eliminate all other pixels (for instance by changing them from their recorded value to 'white'), and then process the image based solely on the identified intensity edges. Region-based algorithms that group together pixels having similar properties, are not used in the preferred embodiment, but may be incorporated for the lens control algorithm of other embodiments of the invention.

In U.S. Pat. No. 5,721,692, Nagaya et al present a 'Moving Object Detection Apparatus'. In that disclosed invention, a moving object is detected from a movie that has a complicated background. In order to detect the moving object, there is provided a unit for inputting the movie, a display unit for outputting a processed result, a unit for judging an interval which is predicted to belong to the background as part of a pixel region in the movie, a unit for extracting the moving object and a unit for calculating the moving direction and velocity of the moving object. Even with a complicated background in which not only a change in illumination condition, but also a change in structure occurs, the presence of the structure change of the background can be determined so as to detect and/or extract the moving object in real time. Additionally, the moving direction and velocity of the moving object can be determined. Such an apparatus as in used by Nagaya, or in other inventions or algorithms for moving object detection, may be incorporated in some embodiments of the 3-D Phenomenoscope as a means to identify the synchronization events controlling the viewer glasses.

DETAILED DESCRIPTION OF THE FIGURES

Preferred Embodiment

FIG. 1

FIG. 1 is a block diagram 100 illustrating a preferred embodiment of the 3-D Phenomenoscope invention for connection-free Pulfrich glasses For exemplary purposes, FIG. 1 shows the 3-D Phenomenoscope in one of the three states that the lenses can take. FIG. 1 shows the right lens 101 darkened and the left lens 102 as clear. This is the configuration to view a motion picture with a 3-dimensional effect in which the lateral motion is moving from left-to-right on the viewing screen In the preferred embodiment, the viewing glasses 110 consist of a right lens 101, a left lens 102, and a Glass Lens Controller Unit (GLCU) 103. The GLCU 103 includes a digital sensor to take pictures or snapshots of the displayed motion picture, a processor to process the recorded images in successive frames and identify synchronization events, and can send signals to independently control the darkness of the right and left lenses based on the detected synchronization events.

In the preferred embodiment the viewing glasses may contain the GLCU 103 as an integrated part of the lenses. Other embodiments of the invention may have 3-D Phenomenoscope viewing glasses that fit over regular prescription glasses in a manner similar to that in which snap-on or clip-on sunglasses are configured.

FIG. 2

Figure 2:
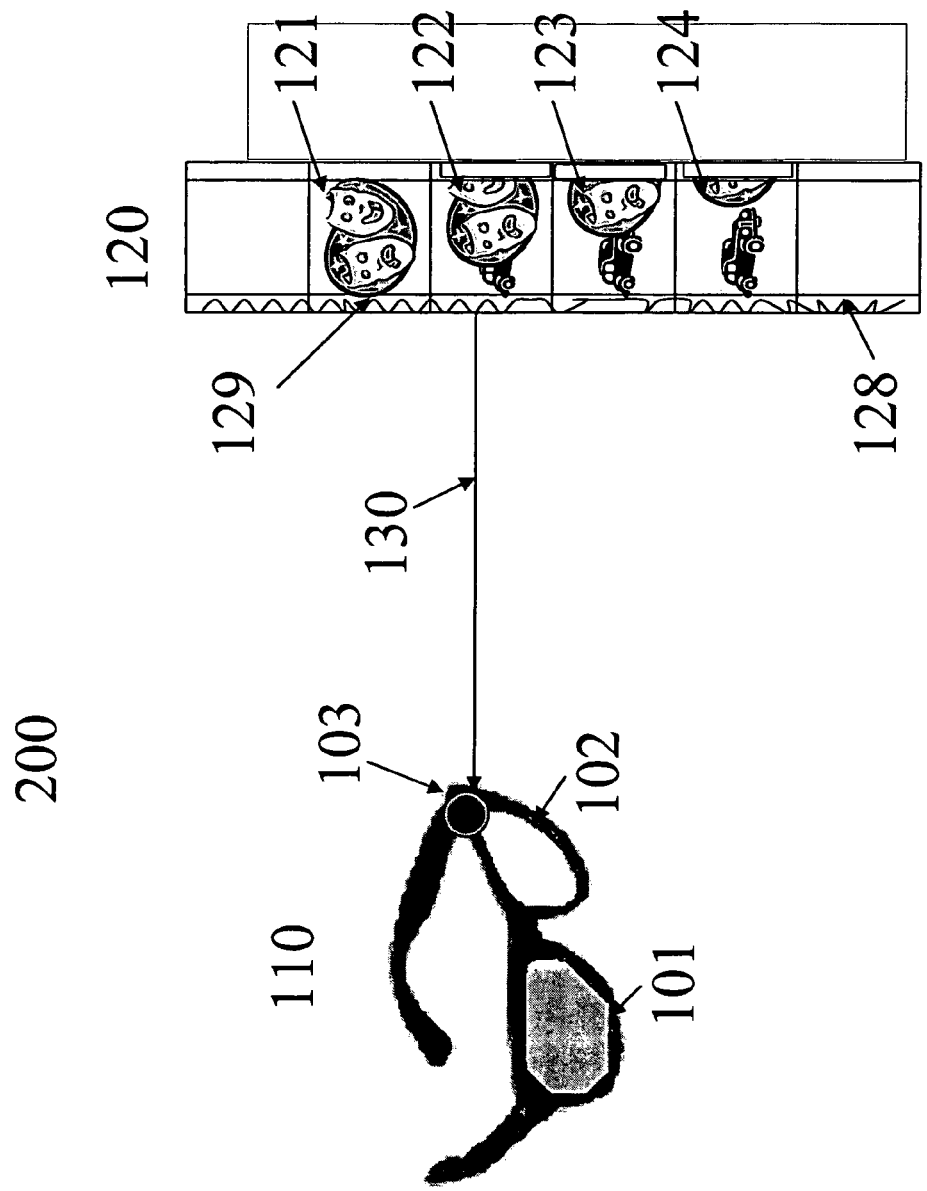
FIG. 2 is a block diagram illustrating use of the 3-D Phenomenoscope to view an ordinary motion picture with a 3-dimensional effect.

FIG. 2 is a block diagram 200 illustrating use of the 3-D Phenomenoscope to view 125 an ordinary motion picture with a 3-dimensional effect.

In the preferred embodiment the motion picture 120 is a regular motion picture consisting of consecutive frames 121 or pictures that make up the motion picture. As the motion picture 120 is played for the viewer, the GLCU 103 unit records discrete images of the motion picture, digitally processes the successive images to identify synchronization events, and uses the synchronization event to control the darkness state of the right and left lenses of the 3-D Phenomenoscope viewing glasses.

Four consecutive frames of a similar scene 121-124 are displayed with lateral motion moving across the motion picture from the left to the right direction. The foreground figure is passing in front of a figure of a vehicle in the background. The left lens 102 is shown in a clear state, and the right lens 101 is shown in a dark state, which is the Pulfrich Filter Spectacles 110 configuration to view the displayed left-to-right lateral motion with the Pulfrich 3-D visual effect.

The motion picture media is shown pictorially as regular film, though the preferred embodiment works equally well if the media is any form for digital motion pictures. The invention works equally well with any of the formats of regular film.

FIG. 3

FIG. 3 is a block diagram 300 showing the 3 lens states used by the 3-D Phenomenoscope.

FIG. 3a shows the lens states with the both the right and left lenses clear. Neither lens is darkened. This is the lens state that is used in the preferred embodiment when there is no significant lateral motion detected in the motion picture.

FIG. 3b shows the lens states with the left lens clear and the right lens darkened. Note that the left lens covers the viewers left eye, and the right lens covers the viewer's right eye. This is the lens state that is used in the preferred embodiment when foreground lateral motion is detected in the motion picture that is moving from the left to the right direction, as seen from the viewer's perspective.

FIG. 3c shows the lens states with the left lens darkened and the right lens clear. This is the lens state that is used in the preferred embodiment when the foreground lateral motion is detected in the motion picture that is moving from the right to the left direction, as seen from the viewer's perspective.

In the preferred embodiment of the invention the lens state consisting of both left and the right lens darkened, is not used. This lens state can be achieved by the 3-D Phenomenoscope, and may have uses in other embodiments of the invention.

In other embodiments of the invention, the right and left lenses of the viewing glasses may take a multiplicity of different levels of darkness to achieve different effects, resulting in more lens states that shown for demonstration purposes in the preferred embodiment. In particular, the darkening of the non-clear lens can be optimized according to the speed of lateral motion, so as to maximize the degree of 3-dimensional effect.

FIG. 4

Figure 4:
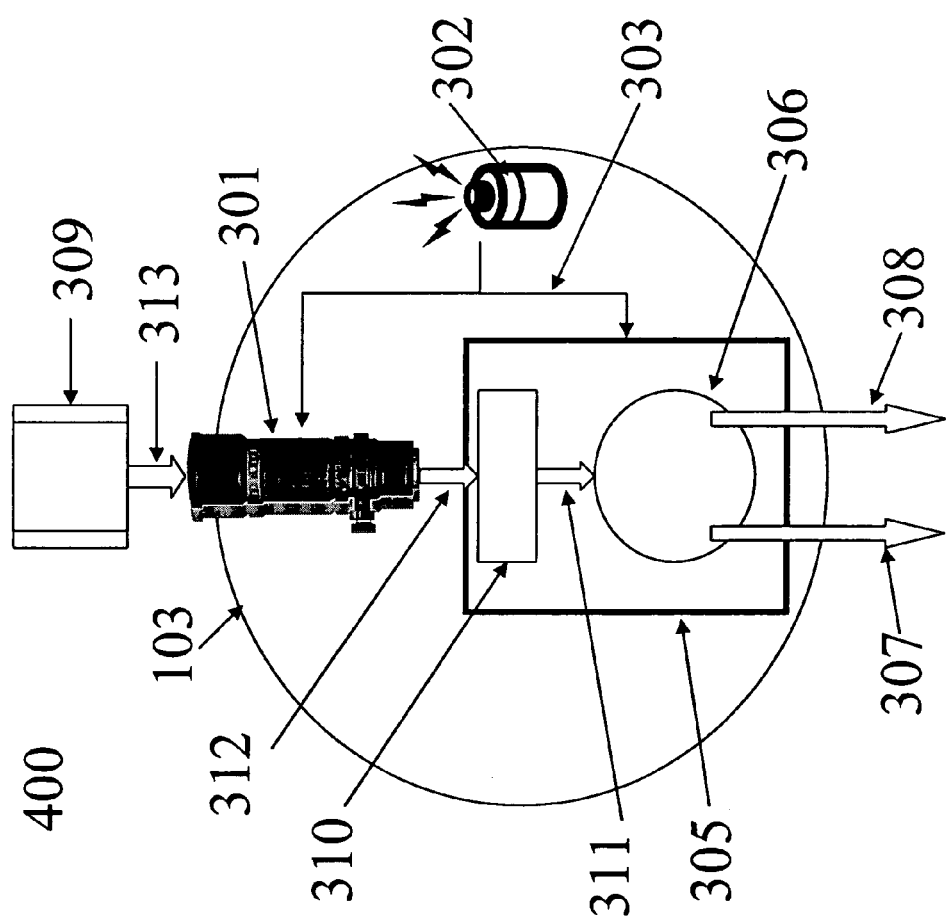
FIG. 4 is a block diagram of the Glass Lens Controller Unit, or GLCU 103.

FIG. 4 is a block diagram 400 of the Glass Lens Controller Unit 103 (GLCU). First, light from the motion picture media frame 309 travels 313 to the digital sensor 301 of the Glass Lens Controller Unit 103. The digital sensor 301 responds by digitizing the image and storing 312 the digitized image in a digital pixel array 310. For simplicity, FIG. 4 shows the GLCU storing 312 only a single image of the motion picture. In the preferred embodiment the GLCU can store two or more successive images in the digital pixel array 310. Processing to identify synchronization events is performed by comparing the successive images and determining the direction of lateral foreground motion.

The digital pixel array 310, the computer processor 305, and the digital sensor 301 are powered 303 by a battery 302.

Running on the computer processor 305, is a lens control algorithm 306. The lens control algorithm 306 accesses 311 the digitized images stored in the digital pixel array 310, and processes the digitized values representing the digitized media frames 309. The lens control algorithm 306 can determine synchronization events and control the state of the left 102 and right 101 lenses of the viewing glasses 110. The lens control algorithm accesses 311 the digitized images stored in the digital pixel array 310.

In the preferred embodiment of the invention, the lens control algorithm 306 uses an intensity edge finding algorithm to detect similar foreground objects in the successive frames of the motion picture. The lens control algorithm 306, identifies the synchronization events by detecting the presence or absence of foreground lateral motion, and if there is foreground lateral motion, the direction of that motion. By comparing the position of the like object, the lens control algorithm 306 can determine whether there is motion in the motion picture, and the direction of the motion. Change in the presence or absence of motion, or a change in the direction of motion is a synchronization event used to control the darkness state of the lenses, and allow the viewer to view a motion picture with the illusion of 3-dimensions. The proper state of the lens, dark or clear, is controlled by an electronic signal 307 that controls the state of the left lens, and another electronic signal 308 to control the state of the right lens.

If no lateral motion is detected in the motion picture, then the lenses are set to the configuration of FIG. 3a, with both left and right lens clear. If lateral motion is detected moving across the screen from the left to the right, then the lenses are set to the configuration of FIG. 3b, with a left lens clear, and the right lens darkened. If lateral motion is detected moving across the screen from the right to the left, then the lenses are set to the configuration of FIG. 3c, with left lens darkened, and the right lens clear.

In the preferred embodiment the lens state is clear when there is an absence of electrical current, and darkened when current above a threshold value is present.

If the lens control algorithm cannot identify any foreground lateral motion in the motion picture, then the GLCU 103 sets the left and right lenses to clear-clear by causing no current to pass over the viewing glass left control circuit 307, and no current over the viewing glass right control circuit 308. If the lens control algorithm identifies foreground lateral motion in the motion picture moving from the left to the right of the motion picture, then the GLCU 103 sets the left and right lenses to clear-dark by causing no current to pass over the viewing glass left control circuit 307, and current in excess of a threshold level to pass over the viewing glass right control circuit 308. If the lens control algorithm identifies foreground lateral motion in the motion picture moving from the right to the left of the motion picture, then the GLCU 103 sets the left and right lenses to dark-clear by causing no current to pass over the viewing glass right control circuit 308, and current in excess of a threshold level to pass over the viewing glass left control circuit 307.

Note that some digital sensors 301 may include memory to store the measured picture values and can read them out to a memory 310 on command, and other digital sensors 301 may have to read out the values continuously as they are converted from light to pixel values. In either case, the digital pixel array 310 captures the essence of what is required—that the digital sensor 301 convert light to numerical pixel values, and provide these numerical values to the processor 305 for storage in the digital pixel array 310 so the lens control algorithm 306 can process the values in successive media frames, and cause the viewer glasses 110 to take the appropriate state based on the detected synchronization events.

FIG. 5

Figure 5:
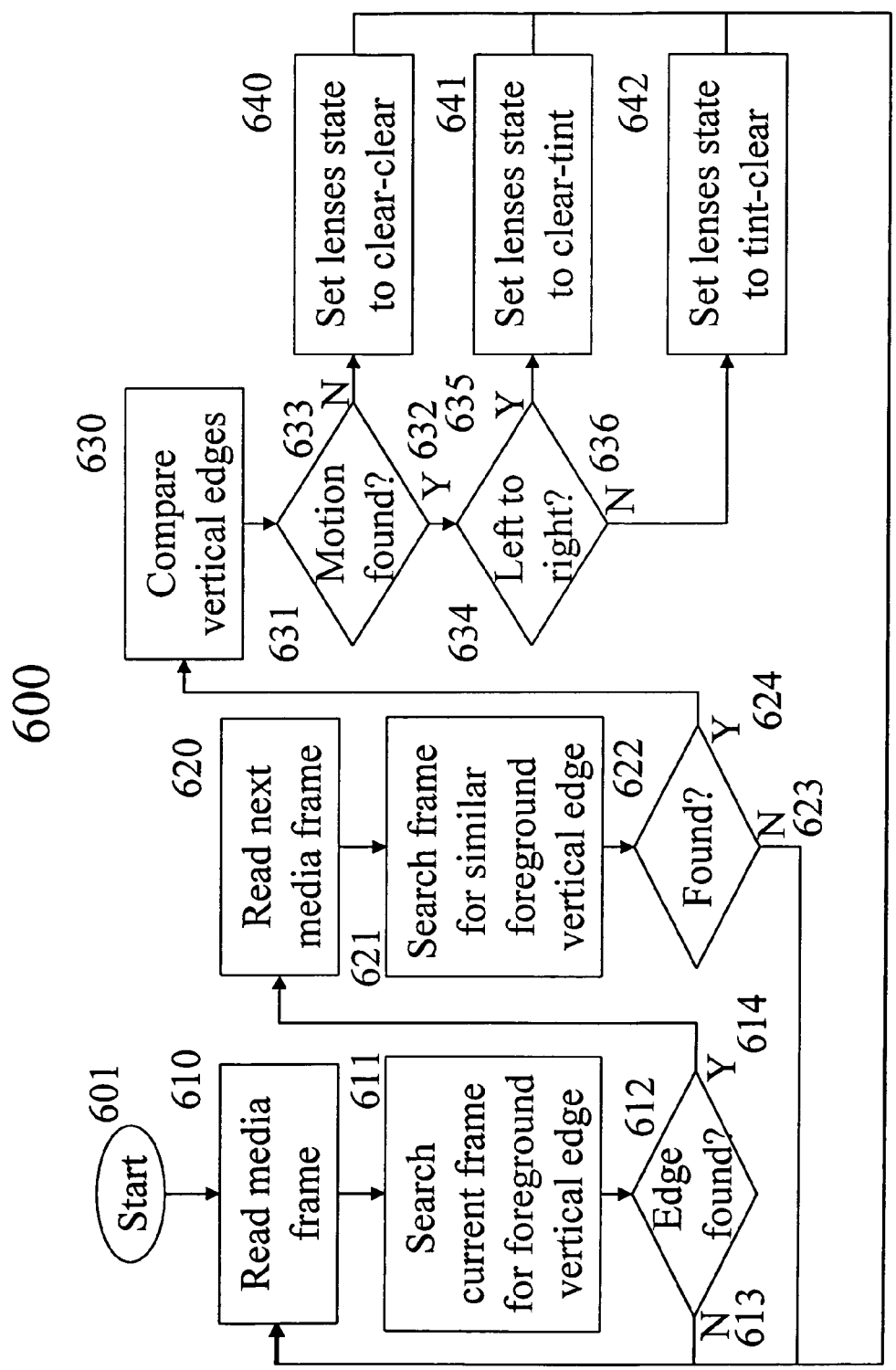
FIG. 5 is a flowchart for the operation of the lens control algorithm.

FIG. 5 is a flowchart for the operation of the lens control algorithm. It shows a flowchart 600 for the calculation by the lens control algorithm of the control parameters that synchronize the viewer lenses to the foreground lateral motion of the motion picture. For teaching purposes, the flowchart depicts a simplified algorithm, in which only two frames are read, processed, and compared for the presence of motion, and controlling instructions issued that set the state of the lenses of the viewer glasses. Other embodiments of the invention may consider longer sequences of frames to detect motion and identify synchronization events.

In the preferred embodiment of this invention we utilize an intensity edge finding algorithm to identify vertical edges in the foreground of the motion picture, and then test for movement of this intensity edge across successive frames of the motion picture. If an intensity edge is identified as moving from the right to the left, then the 3-D Phenomenoscope left lens is set to dark, and the right lens set to clear. If the intensity edge is identified as moving from the left to the right, then the 3-D Phenomenoscope left lens is set to clear, and the right lens set to dark. If the intensity edge is determined not to be in motion, then both the right and left lens are set to a clear state. Other embodiments of the invention may use other algorithm to detect the direction of lateral motion, and set the left and right lenses of the 3-D Phenomenoscope accordingly.

The algorithm begins by initialization at the 'Start' step 601. It then reads a first media frame 610. An intensity edge algorithm 611 searches for vertical edges in the frame, and identifies a single prominent vertical edge. Branching logic 612 takes one of two actions depending upon whether a vertical intensity edge has been identified. If no vertical edge has been selected 613, then operation continues operation by re-reading a new first media frame 610. If a vertical edge has been selected 614, then operation continues by reading the next sequential media frame 620.

The same intensity edge algorithm that was used to process the first media frame is now used to process 621 the next sequential media frame. A list of all vertical intensity edges is identified, and compared 622 with the single prominent vertical intensity edge selected from the first media frame. If the single prominent vertical edge identified and selected from the first media frame is not found 623 in the list of vertical intensity edges from the second media frame, then operation continues by reading a first media frame 610. If the single prominent vertical edge identified and selected from the first media frame is found 624 in the list of vertical intensity edges from the second media frame, then the operation continues by comparing the edges for the presence of motion 630.

If the comparison of the detected vertical intensity edges between the first media frame and the second media frame 631, determines that there is no motion in the sequential frames, then the lens control algorithm sets the left and right viewer lenses to the state clear-clear 640, and operation continues by reading a first media frame 610. If the comparison of the detected intensity edges between the first media frame and the second media frame 632, determines that there is motion in the sequential frames, then operation continues by considering the direction of motion.

Comparison of the similar intensity edges is done to determine whether there is lateral translation of the edges. The first image is used to register the image, and then the second image compared with the registered image. A translation of the vertical edge of the registered image is interpreted by the algorithm as lateral motion. Its direction can be calculated. In other embodiments of the invention the speed of motion can determined and may be used advantageously in determination of the synchronization events. While the simplest algorithm is used in the preferred embodiment for teaching purposes, the algorithm will likely require that directional movement be detected across several frames to trigger a synchronization event.

The vertical intensity edges are compared to determine if the lateral movement in the sequential frames is from left-to-right directions 634. If there is left-to-right lateral movement detected 635, then the lens control algorithm sets the left and right viewer lenses to the state clear-dark 641. If the direction of movement is not left-to-right then the algorithm assumes the motion is in the right-to-left direction 636, and the lens control algorithm sets the left and right viewer lenses to the state dark-clear 642. In either case, operation continues with the reading of a first media frame 610.

The preferred embodiment uses the simple described intensity edge-based finding algorithm to identify the direction of lateral motion and use that to synchronize the darkness of the right and left lens to the foreground lateral motion. Other embodiments of the invention may use any other algorithm that can detect the direction of lateral motion in a motion picture to determine the synchronization events for control of the lenses. Other embodiments may use categories of image processing algorithms other than intensity edge-based algorithm to identify the synchronization events. Other embodiments may not only detect foreground lateral motion, but estimate parallax, the speed of lateral motion, etc, and use such information to determine the synchronization of the right and left lens darkening to the motion picture content.

Simple lateral-left, or lateral-right screen movement is just one example of screen movement that can be used to advantage in the 3D Phenomenoscope. The preferred embodiment that has been described uses a simple algorithm to demonstrate the principles of the 3D Phenomenoscope by detecting such lateral motion in motion pictures. But as previously explained in the discussion of the principles of the Pulfrich illusion, other more complicated types of motion in a motion picture can provide a visual effect using the Pulfrich illusion, and these can also be detected by the Lens Control Algorithm and beneficially implemented in the 3D Phenomenoscope.

In the preferred embodiment, a single prominent intensity edge is identified and its movement tracked across several frames to identify the direction of motion. Other embodiments may use algorithms that track a multiplicity of edge objects, and this can be used advantageously in other embodiments of the lens control algorithm to calculate synchronization events to control the 3D Phenomenoscope. For each such edge object the relative speed of motion and direction can be estimated from successive frames of the motion picture, and such calculated information used to identify different types of motion and related synchronization events. For instance if different edge objects on the left and right hand side of the screens are both moving at the same speed but in different directions, this may be an indication that the camera is either panning in or out, and may be used to control special configurations of lens occlusion densities. In another example, different edge objects moving in the same direction but at different speeds can be used to estimate parallax, which also may be used to control special configuration of lens hues In other embodiments of the invention, the processor may have a multiplicity of different lens control algorithms which may be selected either by the viewer, or selected under computer control. For instance, different lens control algorithms may be appropriate for black and white or color motion picture media. In this case, the selection of which lens control algorithm to use could be either detected by the Phenomenoscope and selected, or selected by the viewer using a selection button on the viewer glasses.

Since identification of lateral movement in the film can be confounded by head-movement, other embodiments may use a lens control algorithm could detect such head movement, or the 3-D Phenomenoscope could otherwise need to account for it. The lens control algorithm can detect and correct for head movement by tracking the picture enclosing rectangle, and suitably accounting for any detected movement. Other embodiments may utilize motion detectors as part of the 3-D Phenomenoscope apparatus. The motion detectors would detect and measure head motion that would be used by the lens control algorithm to make suitable adjustments, or that could be used to trigger a heuristic rule operating in the lens control algorithm. For instance, such a heuristic rule may place the 3-D Phenomenoscope into a clear-clear state if any head movement is detected.

More specifically in the preferred embodiment of the invention we can use any algorithm that can detect motion, and the direction of lateral motion.

FIG. 6

FIG. 6 is the decision procedure used by the real-time control algorithm to control the state of viewer glasses. The decision procedure is used for control of the 3-D Phenomenoscope Pulfrich filters, and demonstrates how the right and left lenses of the viewer glasses are controlled based on the identification of synchronization events.

Throughout the viewing of the motion picture the decision rule 700 is reevaluated based on processing of successive frame images as captured, recorded, digitized and processed by the 3-D Phenomenoscope apparatus. At each decision point in the processing, the decision rule first determines if a synchronization event has taken place—i.e. that the lenses of the viewer glasses need to be placed in one of the states where lenses have different states, so as to view lateral motion in the motion picture with a 3-dimensional effect. If no synchronization event is present then both of the lenses of the viewer glasses are set to clear a clear state.

If a synchronization event has been identified, then the decision rule determines the type of synchronization event. The two types of synchronization events in the preferred embodiment are to synchronize the viewer glasses for left-to-right lateral motion on the screen, or to synchronize the viewer glasses for right-to-left lateral motion on the screen.

If the synchronization event is for left-to-right lateral motion on the screen then the decision rule will cause the 3-D Phenomenoscope to take the state where the left lens is clear and the right lens is partially occluded or darkened. If the synchronization event is for right-to-left lateral motion on the screen then the decision rule will cause the 3-D Phenomenoscope to take the state where the right lens is clear and the left lens is partially occluded or darkened.

In the preferred embodiment, the synchronization events are calculated by an intensity edge algorithm that is suited to detect foreground lateral motion in successive frames of the motion picture. Other embodiments of the invention may use entirely other means to identify synchronization events, which are then used by the decision rule for control of the lenses of the 3-D Phenomenoscope lenses. Other embodiments may have more than 2 synchronization events (states where the right and left lens take different hues), and would use similar though more complicated synchronization decision rules to control the lenses of the viewer glasses.

The synchronization algorithm may also utilize various heuristic rules in determining a synchronization event. For instance, if the viewer lenses responding to rapidly detected changing lateral motion, switch states too rapidly, this may cause undue discomfort to the viewer.

Rapid synchronization events may be a problem for people who are photosensitive—people who are sensitive to flickering or intermittent light stimulation. Photosensitivity is estimated to affect one in four thousand people, and can be triggered by the flicker from a television set. While photosensitive people may simply remove the 3-D Phenomenoscope, heuristic rules could be employed to reduce flicker and eliminate any additional photosensitivity from the 3-D Phenomenoscope. For instance, such a heuristic rules may implement logic in the synchronization decision rule that require that no change to a synchronization event can take place for a set number of seconds after the last synchronization event—i.e. a lens state must be active for a minimum length of time before a new state may be implemented.

When a camera travels primarily forward or back, lateral movement can take place on both sides of the screen. To address this, a heuristic rule may set a default setting favoring one direction. Other approaches and equipment may allow the split lens which darken simultaneously with the inner halves darkening when the camera is retreating, or the two outer halves darkening when advancing.

In other embodiments, detection of a synchronization event would change the state of the lenses for a specific length of time. For instance, the synchronization event may change the right and left lenses to a corresponding darkened-clear state for 10 seconds and then change back to a default state of clear-clear. Even if another synchronization event were to be detected in that 10 second interval, those subsequent synchronization events would be ignored. This would prevent too rapid changes to the state of the lenses that might be uncomfortable for the viewer.

It may be preferable to only activate the 3-D Phenomenoscope when sustained lateral movement is detected—i.e. a couple of seconds after the lateral motion is first detected. This would be accomplished using a heuristic rule that only engages the synchronizations a set length of time after sustained motion has been detected. Since individuals' have different levels of photosensitivity, the sustained lateral movement time interval could be set or selected by the viewer to reflect their own comfort level.

Heuristic rules may be implemented in the decision rule to account for other situations in the determination of synchronization events.

Other Embodiments

The preferred embodiment is an implementation of the invention that achieves great benefit to the viewer of a motion picture by using timed signals that are determined by apparatus included in the 3D Phenomenoscope to move a Pulfrich filter before one eye or the other as appropriately synchronized to the current direction of screen foreground movement. It described filtering spectacles with no moving parts and no wire connections and use material that partially occludes or entirely clears the lenses of the Pulfrich filter in response to the electronic signal.

Synchronization

In other embodiments of the invention, the user can select which parts of the media frame are to be searched for synchronization and control information. The CNN scrolling news headlines provides a good example of a situation where lateral motion is isolated in only a single area of the screen. CNN scrolling news headline appear along a small horizontal strip at the bottom of the screen, generally with a commentator providing other news coverage, with little if any lateral motion that could be used to advantage by the Pulfrich effect. In this case, it would be preferable to have the intensity edge algorithm search only the lower part of the screen for lateral motion.

Other embodiments of the invention may benefit from several levels of occlusion (other than just clear and one level of darkness) of the lenses of the viewer glasses. In general the slower the foreground lateral motion, the more darkening (delay of the image reaching one eye) is necessary to produce a Pulfrich video effect. Other embodiments may in addition to the direction of foreground lateral motion, also estimate the speed of foreground lateral movement, and use this to provide corresponding synchronization events with different levels of occlusion to one of the lenses of the viewer glasses, so as to maximize the visual effect for the viewer. By similar means, other aspects of the recorded image, such as Parallax may be measured and used.

Another embodiment requires that the synchronization events be predetermined and incorporated into the motion picture video. This is implemented by single distinct frames of the motion picture, which identify the synchronization events. If a digital cinema projector is used, then each 3D Phenomenoscope synchronization frame can be inserted into the motion picture. When the processor of the digital projector identifies the synchronization frame, it takes appropriate action to control the 3D Phenomenoscope spectacles, but may eliminate the synchronization frame from being projected or displayed to the user. Another means is to 'watermark' the identification of the synchronization event into the frame of the video so it is indistinguishable to the viewer. In this case, the video sensor of the 3D Phenomenoscope records the image, and processes it to identification the synchronization messages within the motion picture and take appropriate control actions. Watermarking may be achieved, for instance by stamping a code in the upper right hand part of the film in a single color. Video filters on the video sensor of the 3D Phenomenoscope can then eliminate all but that watermark color prior to intelligent processing by the processor of the 3D Phenomenoscope to identify the 3D Phenomenoscope synchronization event.

In some embodiments, one may choose to exploit purposeful mismatching of Pulfrich 3D screen action direction and lens darkening. Spectacular cost-free special effects are to be mined from the phenomenon called pseudo-stereopsis which is usually an error in mounting stereo photo-pairs, so that each eye is channeled the perspective meant for the other eye. As mentioned, positive (solid) space will appear as negative (open), rear objects may appear forward of front objects. In an image of two suburban houses with a space of open sky visible between them, the sky will appear forward and solid, the house recessed openings, like caves, imbedded in the sky.

Equipment

Other embodiments of the invention may have more complex equipment with higher pixel resolutions, more than four lens states, and more complex controller algorithms. These other embodiments would still operate on the same principle—glasses that have a digital sensor, computer processor with a synchronization and control algorithm running on the computer processor that can identify synchronization events from processing the successive recorded images of the motion picture, and use that control information to control the state of the glass lenses.

Other embodiments of the 3-D Phenomenoscope may use other material that can be controlled to change state and partially occlude or entirely clear the lenses of the viewer glasses. In other embodiments the pixel resolution of the digital sensor may be much denser than that specified in the preferred embodiment. And in other embodiments of the invention, other types of digital sensors may be used that can capture images of the motion picture and convert them to a digital representation for processing by the computer processor of the 3-D Phenomenoscope.

The preferred embodiment of the invention uses LCD for the lens materials. Other embodiments of the Pulfrich Filter Spectacles may use other material that can be controlled to change state and partially occlude or entirely clears the lenses of the viewer glasses. Such materials include, but are not limited to suspended particle materials, and electrochromic materials—both of which allow varying levels of transparency dependent on the applied electric charge. Electrochromic materials darken when voltage is added and are transparent when voltage is taken away.

In other embodiments the viewing glasses may include power on/off switches, and/or switches to override the operation of the glasses—e.g. by causing them to stay in the clear state and ignore the detected synchronization information. In other embodiments the 3-D Phenomenoscope may have switches to override the detected synchronization information, and place the viewer glasses in a state for left-to-right lateral motion (clear-dark), or for right-to-left lateral motion (dark-clear).

In other embodiments there may be buttons on the goggles to allow the user to override and control the operation of the goggles. This includes, turning on and off the goggles, controlling the shading of the lenses. For viewer glasses that can take a multiplicity of shades of darkness, this would allow the viewer to control to some extent the extent to which they view the 3-dimensional effect.

In still another embodiment, rather than one clear and one darkened lens, the invention uses two darkened lenses of different intensities.

In another embodiment, the lens control algorithm of the 3-D Phenomenoscope can be disabled, and synchronization user-controlled. In still another embodiment the lens control algorithm is operational, but can be overridden by user controls, for instance by a hand actuated switch.

In yet another embodiment, the functional equivalent of the glass lens controller unit (GLCU) is contained within a detached device, preferably a commonly used portable consumer device such as a cell phone. Cell phones are already commonly equipped with telephone and Internet access, have memory, power supply, LCD display, buttons to enter information (or touch screens), picture or motion picture sensor, processor, operating systems such as Palm OS, or Windows Mobile 2003 OS, (some cell phones have large volume disk storage) and wired or wireless means (e.g. bluetooth) that can be used to connect to the 3D Phenomenoscope. In such an embodiment, a stand is provided so that the cell phone can be positioned with the motion picture sensors aimed at the motion picture screen, and the program to run the synchronization events and operate the synchronization of the 3D Phenomenoscope lenses is running on the cell phone. The program records and processes the video, and determines synchronization events that are then communicated to control the 3D Phenomenoscope by wired or wireless means. Because of the more powerful processing power of the controller in cell phones than can be accommodated as part of the 3D Phenomenoscope spectacles, more powerful algorithms can be run on the cell phone than could be provided by the controllers contained within the 3D Phenomenoscope spectacles.

Visual Effects

In another embodiment of the invention, other types of screen motion can benefit from the 3D Pulfrich illusions, for example for viewing traveling-camera shots. As the camera moves forwards, screen movement moves both left and right outward from the screen center. This could be detected, and in another embodiment of the 3D Phenomenoscope, each lens could half-darken split along their centers, to the left of the left lens, and to the right of the right lens. Similarly when viewing the scene where the camera retreated in space, and screen movement simultaneously appeared from both sides toward the center, center-halves of each spectacle would simultaneously darken.

In still other embodiments, other visual effects, such as secret coding and messages, could be implemented. In these embodiments of 'decoder glasses' special lens configurations, such as left-lens/right lens of Red/Red or any identical color may be used for decoding secret messages.

Another preferred embodiment would allow the viewing of actual 3-dimensional displays in order to exaggerate or produce uncanny depth effects. For instance a use might be for stage effects such as advertising displays or motion-based artworks for display in museums and galleries.

While preferred embodiments of the invention have been described and illustrated, it should be apparent that many modifications to the embodiments and implementations of the invention can be made without departing from the spirit or scope of the invention.

The invention claimed is:

1. A system by which a two-dimensional motion picture may be viewed as a 3-D motion picture comprising:

a pair of spectacles comprising a left lens and a right lens, each of said lens allowing transmission of light there through individually controlled;

an image capturing means for processing said motion picture as successive images and converting said successive images to successive digital images for processing;

a synchronizing means for comparing said successive digital images to identify synchronization events and translating said synchronization events into synchronizing signals; and a control unit to individually control said transmission of light through said left lens and said right lens based on said synchronizing signals corresponding to said identified synchronization events, where said right lens and left lens of said glasses are electrically connected with said control unit, said control unit receives said synchronizing signals from said synchronizing means, said synchronizing means connects to said image processing means, whereby two-dimensional motion pictures may be viewed as 3-D motion pictures.

2. The system of claim 1, wherein said right lens and left lens have a clear state and a blocked state partially reducing the transmission of light.

3. The system of claim 1, wherein said left lens and said right lens are manufactured from at least one of a liquid crystal, electrochromic, or smartglass material.

4. The system of claim 2, where said blocked state of said right lens and left lens is caused by color changes.

5. The system of claim 1, where said left lens and said right lens being split lenses comprising inner halves and outer halves, wherein the transmission of light of each half can be individually controlled.

6. The system of claim 1, where said pair of glasses further comprising a frame, in which said right lens and left lens are mounted, and a battery connected with said frame, wherein the image capturing means, the synchronizing means and the control unit all being integrated with said frame and being powered by said battery.

7. The system of claim 1, wherein said image processing means comprises a digital photo sensor.

8. The system of claim 1, wherein said synchronizing means comprises a computer processor and a computer program.

9. The system of claim 8, where said computer program comprises an algorithm to identify a direction of a lateral motion of an image of an object in said motion picture by comparing two successive digital images of said object.

10. The system of claim 9, wherein said computer program comprising an intensity edge map algorithm 11. The system of claim 1, wherein said synchronizing means comprises a dedicated miniaturized computer.

12. The system of claim 1, where said synchronization events comprises:

A left-to-right movement of said lateral motion corresponding to a setting in which said right lens being in the blocked state and said left lens being in the clear state;

A right-to-left movement of said lateral motion corresponding to a setting in which said left lens being in the blocked state and said right lens being in the clear state; and No significant movement of said lateral motion corresponding to a setting in which said left lens and said right lens being all in the clear state.

13. The system of claim 1, where said synchronization events further comprises:

when said lateral motion directs to both sides, setting said left lens and said right lens being in a state defaultly determined.

14. The system of claim 1, where said synchronizing signal comprises at least one of electro-magnet, radio frequency. sound or light.

15. The system of claim 1, where said control unit controlling the transmission of light by generating electrical currents above or below a set threshold, above which the lens is blocked, and bellow which the lens is clear.

16. The system of claim 1, where said control unit further comprises a power on/off switches.

17. The system of claim 1, where said control unit further comprises a manual controller for controlling the transmission of light manually.

18. The system of claim 15, where said threshold can be manually set by a user.

19. The system of claim 1, where the image processing means, synchronizing means and the control unit being integrated into a device separate from said pair of glasses.

20. A method of showing a two-dimensional motion picture as a 3-D motion picture comprising the steps of:
   providing a pair of spectacles for having a left lens and a right lens, each of said lens allowing transmission of light there through individually controlled;
   displaying said two-dimensional motion picture;
   processing said motion picture as successive images and converting said successive images to successive digital images;
   comparing said successive digital images to identify synchronization events according to the following rules:

A left-to-right movement of said lateral motion corresponding to a setting in which said right lens being in the blocked state and said left lens being in the clear state;
   A right-to-left movement of said lateral motion corresponding to a setting in which said left lens being in the blocked state and said right lens being in the clear state; and
   No significant movement of said lateral motion corresponding to a setting in which said left lens and said right lens being all in the clear state;
   transforming said synchronization events into synchronizing signals;
   transmitting said synchronizing signals; and
   controlling said transmission of light through said left lens and said right lens based on said synchronizing signals corresponding to said identified synchronization events.

21. The method of claim 20, where said synchronization events further comprises:
   when said lateral motion directs to both sides, setting said left lens and said right lens being in any state defaultly determined.

22. The system of claim 1, where each lens of said spectacles comprise two layers of Polaroid, each layer of said Polaroid is optical active with adjustable polarizations.

23. The system of claim 22, where each lens of said spectacles having said blocked state partially reducing the transmission of light by changing an alignment of the polarizations of said two layers of Polaroid.

24. The system of claim 1, where said spectacles further comprise swingable directional filters including a micro-louver mounted in front of each lens.

* * * * *